US012408633B2

(12) United States Patent
Mars et al.

(10) Patent No.: US 12,408,633 B2
(45) Date of Patent: Sep. 9, 2025

(54) METHOD AND APPARATUS FOR DELIVERING FLUID DROPLETS ONTO AN OPEN AND STATIONARY TRAY

(71) Applicant: Desvac, Saint-Barthelemy D'Anjou (FR)

(72) Inventors: Julie Mars, Saint-Barthelemy D'Anjou (FR); Béatrice Scherdel, Saint-Barthelemy D'Anjou (FR); Olivier Boisdon, Saint-Barthelemy D'Anjou (FR)

(73) Assignee: Desvac, Saint-Barthelemy-d'Anjou (FR)

( * ) Notice: Subject to any disclaimer, the term of this patent is extended or adjusted under 35 U.S.C. 154(b) by 0 days.

(21) Appl. No.: 18/016,423

(22) PCT Filed: Jul. 16, 2021

(86) PCT No.: PCT/FR2021/051331
§ 371 (c)(1),
(2) Date: Jan. 16, 2023

(87) PCT Pub. No.: WO2022/013507
PCT Pub. Date: Jan. 20, 2022

(65) Prior Publication Data

US 2023/0180720 A1 Jun. 15, 2023

(30) Foreign Application Priority Data

Jul. 17, 2020 (FR) ...................................... 2007533

(51) Int. Cl.
*A01K 39/01* (2006.01)
*A61D 1/02* (2006.01)
(Continued)

(52) U.S. Cl.
CPC .............. *A01K 39/01* (2013.01); *A61D 1/025* (2013.01); *A61D 7/00* (2013.01); *B05B 1/02* (2013.01);
(Continued)

(58) Field of Classification Search
CPC ...... A01K 43/00; A01K 43/005; A01K 45/00; A01K 45/002; A61D 1/025; A61D 7/00; B05B 13/04; B05B 13/041
(Continued)

(56) References Cited

U.S. PATENT DOCUMENTS 4,316,464 A * 2/1982 Peterson ................ A61D 1/025 604/290
4,449,968 A * 5/1984 Peterson ................ A61D 1/025 604/290
(Continued)

FOREIGN PATENT DOCUMENTS

CA 2427907 A1 7/2004
FR 3009794 A1 * 2/2015 ......... B05B 13/0473
(Continued)

OTHER PUBLICATIONS

International Search Report for corresponding PCT Application No. PCT/FR2021/051331 mailed Nov. 18, 2021.

*Primary Examiner* — Joshua D Huson
*Assistant Examiner* — Brook Victoria Schmid
(74) *Attorney, Agent, or Firm* — Wood Phillips Katz Clark &Mortimer

(57) ABSTRACT

The present invention relates to a method and apparatus for delivering droplets of fluids onto an open tray containing poultry, the tray being stationary. According to the invention, the method comprises the following steps: (a) a movable arm is moved over the tray in translation in a first direction, said arm supporting a first set of dispensing nozzles and a
(Continued)

second set of dispensing nozzles, said nozzles of each set being arranged to cover the entire dimension of the tray in a second direction perpendicular to the first direction; (b) initially, droplets of at least one first fluid are dispensed by spraying using the first set of dispensing nozzles; (c) and then at least one second fluid, distinct from said at least one first fluid to be sprayed, is dispensed by ejecting individual drops by means of the second set of dispensing nozzles.

14 Claims, 3 Drawing Sheets

(51) Int. Cl.
*A61D 7/00* (2006.01)
*B05B 1/02* (2006.01)
*B05B 12/14* (2006.01)
*B05B 13/04* (2006.01)
*A01K 45/00* (2006.01)

(52) U.S. Cl.
CPC ........ *B05B 12/1472* (2013.01); *B05B 13/041* (2013.01); *A01K 45/00* (2013.01)

(58) Field of Classification Search
USPC ........ 119/72.5, 665, 673, 677; 604/289, 290
See application file for complete search history.

(56) References Cited

U.S. PATENT DOCUMENTS

| | | | | |
|---|---|---|---|---|
| 4,850,997 | A | * | 7/1989 | DuBose ................ A61D 1/025 604/289 |
| 6,110,455 | A | * | 8/2000 | Hargis ................ A61K 35/741 424/93.46 |
| 9,339,009 | B1 | * | 5/2016 | Larson ................ A01K 13/003 |
| 2002/0104485 | A1 | * | 8/2002 | Lewis ................ A01K 13/003 119/72.5 |
| 2004/0144873 | A1 | * | 7/2004 | Johnston, Jr. .......... A61D 1/025 239/11 |
| 2016/0338815 | A1 | * | 11/2016 | Nguyen ................ A23L 33/135 |
| 2017/0209250 | A1 | * | 7/2017 | Palmer .................... A61D 7/00 |
| 2020/0170769 | A1 | * | 6/2020 | Petri ...................... A01K 45/00 |
| 2021/0077728 | A1 | * | 3/2021 | Anquetil ................ A61M 5/19 |
| 2023/0021847 | A1 | * | 1/2023 | Baranyay ............ A01K 5/0275 |

FOREIGN PATENT DOCUMENTS

| | | | | |
|---|---|---|---|---|
| WO | WO-2005094387 | A2 * | 10/2005 | ........... A01K 45/007 |
| WO | WO-2005099617 | A1 * | 10/2005 | ............ A01K 39/01 |
| WO | WO-2006081316 | A2 * | 8/2006 | ............ A61D 1/025 |
| WO | WO-2016106254 | A1 * | 6/2016 | ............ A61D 1/025 |

* cited by examiner

[Fig. 1]
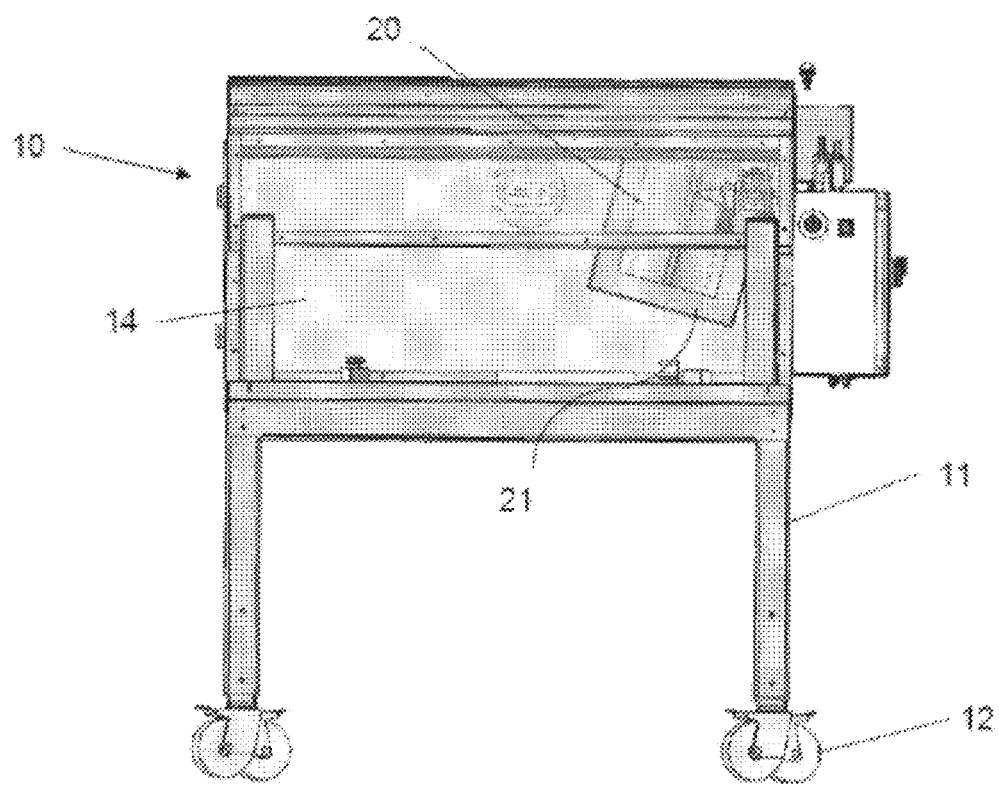

[Fig. 2]
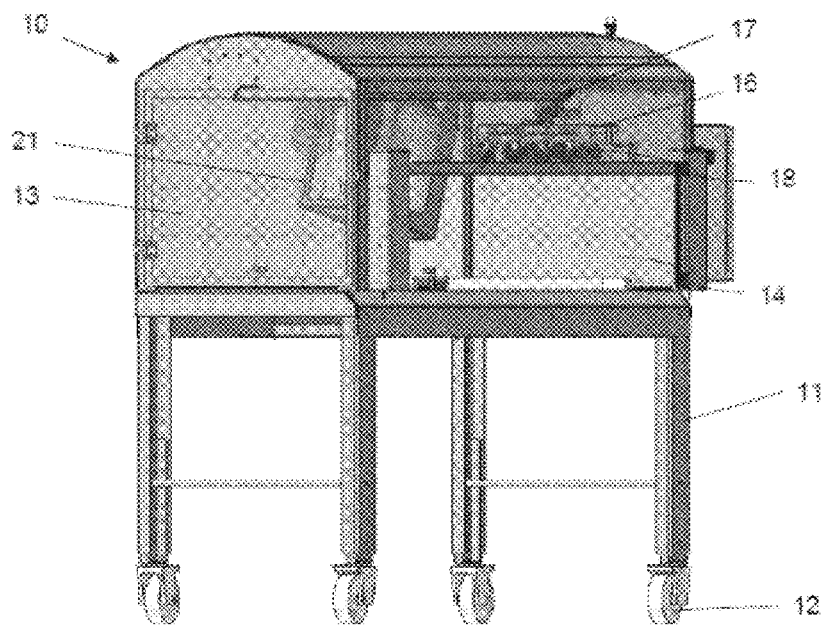
[Fig. 3]
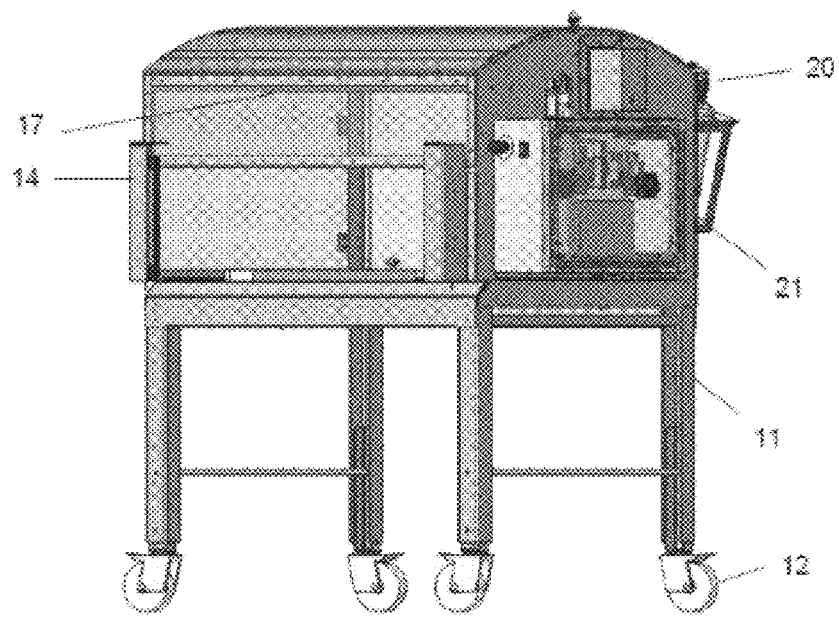

[Fig. 4]
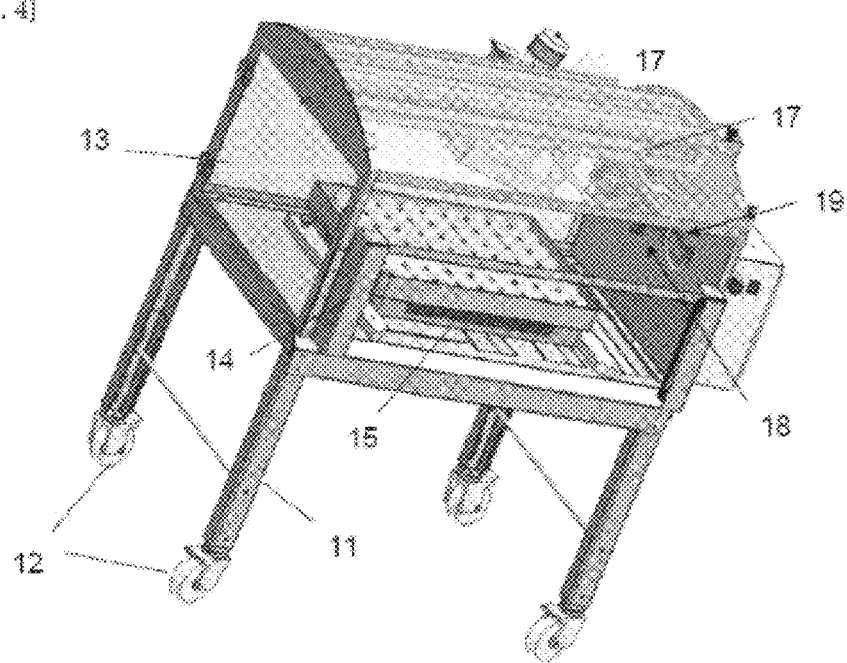
[Fig. 5]
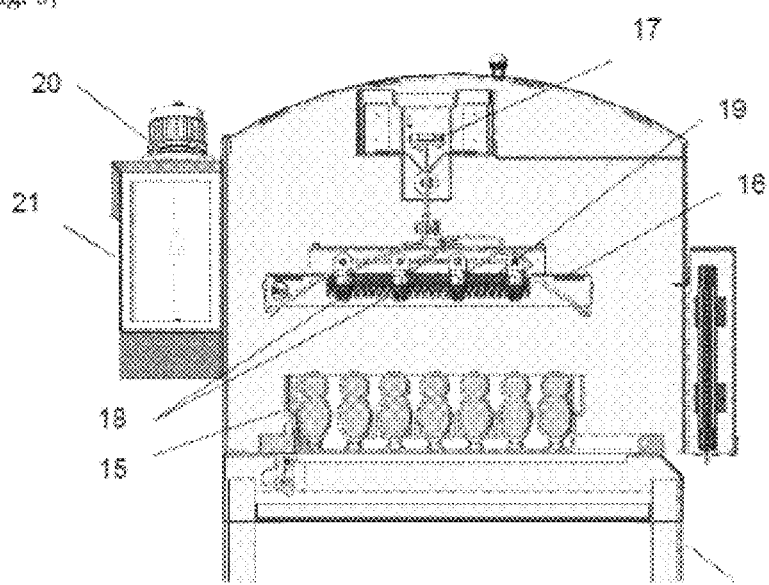

METHOD AND APPARATUS FOR DELIVERING FLUID DROPLETS ONTO AN OPEN AND STATIONARY TRAY

TECHNICAL FIELD

The present invention relates to a method for uniformly delivering droplets of different fluids onto birds placed in an open and stationary tray.

It also relates to an apparatus for dispensing droplets of different fluids onto a fixed tray for implementing this method.

PRIOR ART

In order to deal with constantly increasing food demand, animals from intensive husbandry systems have become increasingly important.

The good health of these animals, particularly for guaranteeing adequate production, calls for prevention and in particular vaccinations for immunizing these animals against various diseases during the first days of their life.

For example, in raising poultry, vaccines are typically administered to chicks at the age of one day or between one (1) and five (5) days of age.

In order to treat a large number of chicks simultaneously, it is known to expose these chicks in trays or baskets, moving on conveyors, to fine droplets of water containing the vaccine to be administered, these droplets being obtained by spraying. The direct contacting of these chicks with the fog of droplets ensures their vaccination by the ocular-nasal route.

It is also known to pass these plates loaded with chicks, by means of conveyors, under nozzles ejecting drops of gel containing a vaccine, these drops, adhering by contact, being for example colored with a color attractive to the chick. A coloration of this type also allows ensuring that the product was taken correctly by a simple visual check of the inside of the animal's mouth.

The drops of gel that have fallen on the body of each chick are thus pecked by other chicks placed in proximity so that each chick receives a sufficient quantity of vaccine.

Fixed supports allow each to support a set of nozzles for delivering droplets of a specific fluid into a dedicated treatment area, these supports being arranged to overhang the conveyors transporting the trays loaded with chicks.

Thus when the chicks are intended to receive different treatments, the trays carrying these chicks are routed by means of conveyors over different treatment areas spaced from one another.

Thus it is noted that the installations allowing mass vaccination of living animals, equipped with conveying systems of this type, are bulky and consequently require extended accommodation spaces.

Installations of this type for the mass vaccination of living animals are therefore not adapted to all types of operation, particularly to husbandry farms with small dimensions.

There exists therefore a pressing need for equipment for mass treatment of living animals, the original design of which allows overcoming the disadvantages of the prior art disclosed above.

OBJECT OF THE INVENTION

The present invention seeks to mitigate the disadvantages of the prior art by proposing a mass treatment method and apparatus for living animals, simple in their design and in their operating mode, reliable, rapid and requiring reduced space for their implementation.

Another object of the present invention is a method of this type and an apparatus of this type for mass treatment of living animals, guaranteeing a homogeneous treatment of each living animal contained in an open tray or basket.

Yet another object of the present invention is a method of this type minimizing treatment fluid losses while ensuring uniform and homogeneous distribution of these fluids on an open tray.

Yet another object of the present invention is a method of this type and an apparatus of this type allowing managing open trays of different sizes.

The present invention also seeks the use of the method and of this apparatus to mass-administer two fluids selected among preventive or therapeutic substances such as vaccines, nutrient substances or even combinations of these elements.

DISCLOSURE OF THE INVENTION

To this end, the invention relates to a method for delivering droplets of fluids onto an open tray containing birds, this tray being fixed. According to the invention, a) a movable arm is moved over this tray, in translation in a first direction, this arm carrying a first set of dispensing nozzles and a second set of dispensing nozzles, said nozzles of each set being arranged to cover the entirety of the dimension of the tray in a second direction perpendicular to the first direction, b) the droplets of at least one fluid are first dispensed by spraying by means of the first set of dispensing nozzles, c) then at least one second fluid is dispensed, distinct from said at least one fluid to be sprayed, by ejection of individual drops by means of the second set of dispensing nozzles.

What is meant here by "bird" is any avian species, such as birds of the class Ayes, i.e. vertebrate animals which are feathered, winged, bipedal, endothermic (hot blooded) and able to lay eggs. In the context of the present invention, bird refers more particularly to birds having economic and/or agronomic value, such as poultry (for example chickens, turkeys, quail, partridges and pigeons), migratory birds (for example ducks and geese) and ornamental birds (for example swans, parrots and psittacines).

An injection apparatus of this type finds application in the field of vaccinating chicks in the few days following their birth, hence between one (1) and five (5) days of age, preferably at the age of one (1) day, or 24 hours after hatching.

This method thus allows administering in very little time at least two distinct fluids to chicks contained in an open tray or basket, while still ensuring homogeneous treatment of each chick.

The original design of this method requires a reduced space for its implementation and it is therefore particularly adapted to implementation in operations with small dimensions.

It is advantageously reliable and economical.

This movable arm being advantageously adjustable in height, the method can be implemented with any type of open tray. The width adjustment is accomplished by withdrawing, blocking by a stopper or the non-use of certain nozzles and/or dispensing tips located on the perimeter of the movable arm.

Advantageously, a method of this type is particularly adapted to the administration of a spray (a first fluid) and of a gel (a second fluid).

According to one particular embodiment of this method for delivering droplets of fluid onto an open tray, the movable arm is moved at a constant or substantially constant speed when it is above the tray. By the ensured continuity of the movement of the arm, i.e. by a movement that is as regular as possible of the latter above the open tray to be treated, a uniform and homogeneous distribution of the droplets of fluid dispensed is ensured for a given flow rate of fluid at each set of dispensing nozzles.

Alternatively, the movable arm being driven by a drive unit including an electric motor, and each fluid to be dispensed being extracted from the receptacle containing this fluid by a syringe, the piston of which is electrically actuated, the acceleration or deceleration of this movable arm is controlled synchronously with the variation of the flow rate of the fluid for each fluid to be dispensed so as to ensure a uniform distribution of the latter on the open tray. Advantageously, this acceleration or deceleration is progressive. An embodiment of this type allows ensuring uniform distribution of the droplets of fluid on the open tray while minimizing the necessary space for the implementation of this method, the acceleration or deceleration of the movable arm being able to be accomplished directly above the open tray.

According to another particular embodiment of this method for delivering droplets of fluid onto an open tray, steps b) and c) are accomplished in a single passage of the movable arm above said tray, these sets of nozzles being arranged on said arm so as to generate a temporal offset between steps b) and c). Preferably, this temporal offset, or delay time, between steps b) and c) is determined to guarantee effective treatment of the birds by each fluid, and particular said at least one second fluid. It is thus ensured that each bird is exposed directly to the second fluid or consumes this second fluid in sufficient quantity so that the mass treatment of the birds is homogeneous. In other words, the time interval between steps b) and c) of fluid dispensing is calculated to avoid the droplet fog obtained by dispensing the first fluid by means of the first set of dispensing nozzles reducing the adhesion or the wetting of the drops of the second fluid ejected by the second set of dispensing nozzles, particularly when the latter fluid is a gel. Alternatively, step b) is accomplished when the arm moves from a first edge to a second edge of this tray, this second edge being opposite to the first edge, over an approach path extending along the first direction and step c) is accomplished when said arm moves from the second edge toward the first edge over a return path along the first direction.

According to yet another embodiment of this method for delivering droplets of fluid to an open tray, before accomplishing step a) the movable arm is progressively accelerated until it reaches a constant or substantially constant movement speed $v_{depl}$ and, after passage of this arm above the plate, it is progressively decelerated to avoid fluid loss. By providing progressive acceleration or deceleration, i.e. without jerks, of the movable arm, fluid losses outside the treatment phases are minimized or eliminated, these losses being able to represent a significant cost to the user. Purely by way of illustration, when steps b) and c) are accomplished in two separate passages above the open tray containing the birds, prior to step a) the movable arm is progressively accelerated until it reaches a constant or substantially constant movement speed $v_{depl}$, for example at the beginning of its passage over the tray. After distribution of the droplets of at least one first fluid on this tray, during an approach movement of the movable arm above this tray (step b), this arm is progressively accelerated until its stoppage in a staging or reversing area of the movable arm, extending outside a reception area of the open tray, the latter then extending only to the dimensions of the tray. For the purpose of a second passage of the movable arm above the same tray to ensure the dispensing of at least one second fluid (step c), the arm is again progressively accelerated in its staging area so that it reaches the tray with a constant or substantially constant speed. The movable arm is then progressively decelerated when it reaches the opposite staging area after the complete treatment of the tray with the two different fluids.

According to yet another embodiment of this method for delivering droplets of fluid onto an open tray, the first fluid is a liquid to be sprayed and the second fluid is a gel such as a soft gel, or a fluid having a viscosity comprised between 50 and 200 cps at 20° C. Preferably, the viscosity of this fluid is comprised between 50 and 180 cps at 20° C. and even better between 54 and 177 cps at 20° C. Even more preferably, the viscosity is comprised between 100 and 120 cps at 20° C. Purely by way of illustration, the first fluid is an aqueous composition containing a vaccine. This gel can include a coloring agent to visually check the uniform distribution of the drops on the open tray.

The feeding circuit of each set can advantageously include an electrical or pneumatic pump to feed the nozzles with the corresponding fluid.

According to yet another embodiment of this method for delivering droplets of fluid onto an open tray, and each of steps b) and c), a plurality of droplets is formed having a uniform or substantially uniform size. For this purpose, it is possible to check the fluid feeding pressure at each nozzle of each set for a given type of nozzle. Preferably, at step b) a fog of droplets is formed, at least 80%, preferably at least 90% of these droplets having a size comprised between 145 microns and 230 microns. Advantageously, a plurality of droplets is formed in step c), at least 80%, preferably at least 90% of these droplets having a size comprised between 900 microns and 1500 microns.

According to yet another embodiment of this method for delivering droplets of fluid onto an open tray, the flow rate at said nozzles and the movement speed of the movable arm are checked to ensure a uniform or substantially uniform distribution of said droplets on said tray. Preferably, the flow rate at each of said nozzles, delivering the first fluid, being comprised between 6 mL/sec and 40 mL/sec, preferably between 8 mL/sec and 20 mL/sec, and the flow rate of each of said tips delivering the second fluid, being comprised between 15 mL/sec and 50 mL/sec, preferably between 15 mL/sec and 25 mL/sec. The pressure applied to deliver the first fluid is comprised between 3 and 130 bars, and the pressure applied to deliver the second fluid is comprised between 0.2 and 1 bar.

According to yet another embodiment of this method for delivering droplets of fluid on an open tray, said fluid incorporating one or more active principles for vaccinating avian species such as birds, or fluids other than vaccines such as nutrient compositions.

According to yet another embodiment of this method for delivering droplets of fluid onto an open tray, at least two distinct first fluids are dispensed by spraying and/or at least two distinct second fluids by the ejection of individual drops. Purely by way of illustration, each set of dispensing nozzles can include two ramps of nozzles for dispensing two different products in a single passage. The present method thus also covers the dispensing of two or more distinct fluids to be sprayed or atomized and/or two or more fluids to be ejected in the form of individual drops. These latter fluids are ejected preferably by tips.

The present invention also relates to an apparatus for dispensing droplets of fluids for the implementation of the method as previously described. According to the invention, this apparatus comprises:

a working area intended to receive and support a tray, the tray being received in a fixed manner, a single arm, movable to move above this working area in a first direction, this arm carrying a set of spray dispensing nozzles and a set of tips, the nozzles and the tips being arranged so that the entirety of the dimension of the tray in a second direction perpendicular to the first direction is covered by this set of spray dispensing nozzles and this set of tips, and this apparatus is configured to ensure a temporal offset between the distribution of at least one first fluid by means of said set of spray dispensing nozzles and at least one second fluid by means of said set of tips.

While being advantageously compact, this apparatus allows delivering in a very short time interval, or quasi-simultaneously, two distinct fluids such as a spray and a gel, for mass treating birds placed in a tray or basket.

A temporal offset of this type between the dispensing of the two fluids allows avoiding the dilution of drops of gel by the fog of droplets of the first fluid.

The spray dispensing nozzles can have flat or conical tips. Preferably they are flat to form a curtain of droplets. Each of these tips is configured to eject an individual drop of fluid through its orifice for a given fluid pressure.

According to one particular embodiment of this apparatus, it includes means for checking the movement speed of the movable arm.

According to another embodiment of this apparatus for dispensing droplets of fluid, the first set of spray dispensing nozzles and the second set of tips are spaced from one another on said movable arm in the first direction. Advantageously, this spacing is calculated to guarantee an effective treatment of birds by the second fluid. By way of an example, the spacing between these two (2) sets is comprised between 4 and 10 cm, preferably between 4 and 7 cm, even more preferably the spacing is 5 cm.

According to one other embodiment of this apparatus, this working area includes staging areas for the movable arm extending on either side of a reception area of the tray, which is preferably adjustable for adapting to different trays. Preferably, the set of nozzles and the set of tips being spaced from one another on the movable arm by a distance d in the first direction, each staging area has a dimension along the first direction at least equal or substantially equal to the distance d separating these sets on this arm.

According to one other embodiment of this apparatus, it includes several sensors for automatically triggering the dispensing of droplets by the apparatus. Alternatively, this triggering can be carried out manually by the operator. By way of an example, one or more cameras and a computer program for processing the images received from this or from these cameras can allow detecting the proper positioning of the basket prior to triggering the actuation of the movable arm. The actuation can also be a combination between the positioning sensors and manual actuation by the operator.

According to yet another embodiment of this apparatus, this set of nozzles comprises at least two subsets of nozzles to each dispense by spraying a distinct fluid and/or this set of tips comprises at least two subsets of tips each for ejecting drops of a distinct fluid. Each of these subsets is connected to its own or a separate fluid feeding circuit.

An apparatus of this type particularly finds application in the veterinary field, in particular in the mass vaccination of chicks.

BRIEF DESCRIPTION OF THE DRAWINGS

Other advantages, aims and particular features of the present invention will be revealed by the description that follows, given for the purpose of explanation and in no way limiting, with reference to the appended drawings in which:

FIG. 1 is a front view of an apparatus for mass treatment of chicks according to a particular embodiment of the present invention;

FIG. 2 is a perspective view of the apparatus of FIG. 1;

FIG. 3 is another perspective view of the apparatus of FIG. 1;

FIG. 4 is a perspective view and a top view of the apparatus of FIG. 1, a basket containing chicks being placed in its working area and awaiting treatment;

FIG. 5 is a transverse section view of the apparatus of FIG. 1, a basket containing chicks being placed in its working area and awaiting treatment;

DESCRIPTION OF ONE EMBODIMENT

The drawings and the description hereafter contain essentially elements of a certain character. They can therefore not only serve to allow better understanding of the present invention, but also contribute to its definition if necessary.

First of all, it is noted that the figures are not to scale.

FIGS. 1 to 5 illustrate schematically an apparatus for the mass treatment of chicks according to one particular embodiment of the present invention.

This apparatus comprises a frame 10 provided with legs 11 including, at their free end, rollers 12 to provide movement of the latter. The apparatus can include from 2 to 4 rollers 12. Each of these rollers 12 can include a blocking member (not shown) to fix the apparatus in position.

This frame 10 includes, in its upper portion, a closed space delimited by walls 13 at least partially transparent to visualize the interior of this space. One of these walls 13 includes a movable flap 14 in vertical translation to allow access to this closed space, particularly for the introduction and the withdrawal of a basket 15 loaded with chicks, also for the cleaning and the maintenance of the apparatus. In addition to this physical barrier consisting of the movable flap 14, and if it is desired that the apparatus be able to remain open, this apparatus can include one or more protection elements (not shown) to detect the presence of an object intruding into the treatment area such as the hand or the arm of an operator. This or these protection elements are able to send detection signals to a central processing unit, which can stop a treatment in progress or even stop the triggering of treatment. By way of an example, this or these protection elements are infrared detectors. Of course, it is still possible that the frame 10 is bereft of a movable flap 14 of this type or even of protection elements of this type.

The interior of this closed space comprises a working area intended to receive and support an open basket 15, this basket 15 then being in a fixed position.

A movable arm 16 mounted on a longitudinal rail 17, defining a first direction, can move in translation along this rail 17 above the working area. The longitudinal rail 17 is integral with the upper end, or hood, of the frame 10.

This movable arm 16 carries a set of nozzles 18 and a set of dispensing tips 19, these nozzles and these tips being arranged on the movable arm 16 so that the entirety of the dimension of the basket 15, in a second direction perpendicular to the first direction defined by the longitudinal rail 17, is integrally covered by the set of nozzles 18 and by the set of dispensing tips 19.

These nozzles and tips can be individually movable along the movable arm 16 to allow an adjustment of the coverage of different baskets.

Of course, this apparatus can include position sensors (not shown) to determine the exact positioning of the basket in the working area. It is then possible to automate the dispensing sequences of the fluids by automatic recognition of the type of basket 15 placed in the dispensing apparatus.

The set of nozzles 18 comprises spray dispensing nozzles while the other set includes dispensing tips 19, each of these tips comprising an orifice, each tip being configured to eject an individual drop of fluid through its orifice for a given fluid pressure.

While still being advantageously compact, this apparatus allows delivering in a short time interval, or quasi-simultaneously, two distinct fluids such as a spray and a gel for mass treating birds placed in an open basket 15.

This apparatus thus includes two reservoirs 20 which are placed in a support 21 at the height of the user, these reservoirs 20 being advantageously transparent for verifying the available fluid level in each of them. In one embodiment, these reservoirs comprise non-therapeutic fluid.

Each fluid feeding circuit connecting a reservoir 20 to its set of nozzles and corresponding dispensing tips comprises a pumping unit (not shown), the pumping unit of the two feeding circuits possibly having different pumping powers depending on the fluid to be pumped in each of these feeding circuits.

The flow rates for feeding the nozzles and the tips as well as the speed of movement of the movable arm 16 are checked to guarantee a uniform and homogeneous distribution of the fluids dispensed on the open basket 15.

The set of nozzles 18 and the set of dispensing tips 19 are also arranged on the movable arm 16 to ensure a temporal offset between the distribution of the first fluid (evaporable fluid) and of the second fluid (gel).

The extended movable arm 16 comprising two lateral edges defining a front face and a rear face, considered in the translation movement direction of this arm in the first direction, the set of nozzles 18 is mounted on the front face of this movable arm 16 while the set of dispensing tips 19 is mounted on the rear face of this movable arm 16, thus being spaced from the set of nozzles 18 in the first direction.

It is thus ensured that the distribution by spraying, or even by fragmentation of the droplets of the first fluid for the first set of nozzles 18, always precedes the distribution of the drops of the second fluid by the set of dispensing tips 19. There thus exists no risk that the fog of droplets formed by spraying of the first fluid can prevent the adhesion of the drops of the second fluid on the feathers of the chicks, which could lead to a non-homogeneous treatment of the latter.

Preferably, the working area of the apparatus includes staging areas of the movable arm 16 extending on either side along the first direction of a reception area of the basket to allow a progressive acceleration and deceleration of the movable arm before and after passage of the movable arm above the basket 15.

Advantageously, it is desired in fact to seek not only to maintain a constant movement speed of the movable arm 16 above the basket 15, but also to avoid jerks in the movement of the arm which would likely cause fluid losses.

For this purpose, the apparatus includes means for checking the movement speed of the movable arm 16.

According to one embodiment of the present apparatus, the minimum distance d spatially separating the set of nozzles 18 from the set of dispensing tips 19, in the first direction, is comprised between 5 and 9 cm. The movement speed of the arm is comprised between 35 and 80 cm/second, preferably 55 cm/second.

What is claimed is:

1. A method for delivering droplets of fluid onto an open tray (15) containing birds, said tray (15) being fixed, characterized in that:
    a) a movable arm (16) is moved above the tray (15), in translation in a first direction, the movable arm carrying a first set of dispensing nozzles (18) and a second set of dispensing nozzles (19), said first and second sets of dispensing nozzles being arranged to cover an entirety of a dimension of the tray (15) in a second direction perpendicular to the first direction, wherein, said moveable arm is progressively accelerated until said moveable arm reaches a constant or substantially constant movement speed and, after passage of said moveable arm above said tray, said movable arm is progressively decelerated to avoid fluid losses, and wherein the arm is only moved at a constant speed when directly over the tray;
    b) droplets of at least one first fluid are dispensed by spraying by means of the first set of dispensing nozzles (18), and
    c) after step (b), at least one second fluid is dispensed, distinct from said at least one first fluid, by ejection of individual drops by means of the second set of dispensing nozzles (19).

2. The method according to claim 1, characterized in that steps b) and c) are accomplished in a single passage of the movable arm (16) above said tray (15), the first and second sets of dispensing nozzles being arranged on said movable arm so as to generate a temporal offset between steps b) and c).

3. The method according to claim 1, wherein, in step b), said movable arm moves from a first edge to a second edge of said tray (15), said second edge being opposite to the first edge, on an approach path extending along the first direction and in step c), said movable arm moves from the second edge toward the first edge over a return path along the first direction.

4. The method according to claim 1, characterized in that said first fluid is a liquid to be sprayed and said second fluid is a gel, or a fluid having a viscosity between 50 and 200 cps at 20° C.

5. The method according to claim 1, characterized in that in each of steps b) and c) a plurality of droplets is formed having a uniform or substantially uniform size.

6. The method according to claim 5, characterized in that in step b) a fog of droplets is formed, at least 80% of the droplets having a size between 145 microns and 230 microns.

7. The method according to claim 5, characterized in that in step c) a plurality of droplets is formed, at least 80% of the droplets having a size between 900 microns and 1500 microns.

8. The method according to claim 1, characterized in that a flow rate of the first and second sets of dispensing nozzles and a movement speed of the movable arm (16) are adjusted to ensure a uniform or substantially uniform distribution of said droplets on the tray (15).

9. The method according to claim 1, wherein said movable arm is driven by a drive unit comprising an electric motor, and each of the at least one first fluid and at least one second fluid is extracted from a receptacle by a syringe, the syringe having a piston which is electrically actuated, and wherein the acceleration or deceleration of said movable arm is controlled synchronously with a flow rate of the at least one first fluid or the at least one second fluid, so as to ensure a uniform distribution of the at least one first fluid or the at least one second fluid on the open tray.

10. The method according to claim 1, wherein the movable arm is moved at a constant or substantially constant movement speed of between 35 and 80 cm/second.

11. An apparatus for distributing droplets of fluids for the implementation of the method according to claim 1, characterized in that it comprises:
a working area intended to receive and support a tray (15), said tray (15) being received in a fixed manner, and
a movable arm (16), movable in translation above said working area along a first direction, said movable arm (16) carrying a set of spray dispensing nozzles (18) and a set of tips (19), the set of spray dispensing nozzles and the set of tips being arranged so that an entirety of a dimension of the tray (15) in a second direction perpendicular to a first dimension is covered by the set of spray dispensing nozzles (18) and the set of tips (19), and wherein said apparatus is configured to ensure a temporal offset between a distribution of at least one first fluid by means of said set of spray dispensing nozzles (18) and at least one second fluid by means of said set of tips (19), and wherein said apparatus is configured to: a) progressively accelerate the movable arm until the movable arm reaches a constant or substantially constant movement speed, b) maintain said constant or substantially constant movement speed only when directly over the tray, and c) after passage of said movable arm above said tray, progressively decelerate said movable arm so as to avoid fluid losses.

12. The apparatus according to claim 11, characterized in that the set of dispensing nozzles (18) and the set of tips (19) are spaced from one another on said movable arm (16) in the first direction.

13. The apparatus according to claim 11, characterized in that said working area includes areas for staging the movable arm (16) extending on either side of a reception area of the tray (15).

14. The apparatus according to claim 11, characterized in that said set of dispensing nozzles (18) comprises at least two subassemblies of nozzles each for spraying a distinct fluid and/or said set of tips (19) comprises at least two subassemblies of tips each for ejecting a distinct fluid.

* * * * *